United States Patent
Fear et al.

(10) Patent No.: US 7,327,442 B1
(45) Date of Patent: Feb. 5, 2008

(54) METHODS AND SYSTEMS OF CALCULATING THE HEIGHT OF AN OBJECT OBSERVED BY A CAMERA

(75) Inventors: Andrew C. Fear, Campbell, CA (US); William Samuel Herz, Hayward, CA (US)

(73) Assignee: Nvidia Corporation, Santa Clara, CA (US)

(*) Notice: Subject to any disclaimer, the term of this patent is extended or adjusted under 35 U.S.C. 154(b) by 12 days.

(21) Appl. No.: 11/290,182

(22) Filed: Nov. 29, 2005

(51) Int. Cl.
*G01C 3/08* (2006.01)
(52) U.S. Cl. .................................................. 356/4.08
(58) Field of Classification Search ................ 356/4.08
See application file for complete search history.

(56) References Cited

U.S. PATENT DOCUMENTS

| | | | | |
|---|---|---|---|---|
| 5,615,677 A | * | 4/1997 | Pelc et al. | 600/410 |
| 5,864,393 A | * | 1/1999 | Maris | 356/28 |
| 2005/0200833 A1 | * | 9/2005 | Nakamura et al. | 356/4.07 |

* cited by examiner

*Primary Examiner*—Thomas H. Tarcza
*Assistant Examiner*—Luke Ratcliffe (57) ABSTRACT

Methods and systems for automatically determining the height of an object observed by a camera are described. One such method involves determining the distance from the top of the object to the camera, determining the distance from the bottom of the object to the camera, measuring the angle of incidence, from the camera's perspective, between the top and bottom of the object, and computing the height of the object from the two distances and the angle of incidence. The method may be computer controlled.

20 Claims, 8 Drawing Sheets

Flowchart 300

Flowchart 500

METHODS AND SYSTEMS OF CALCULATING THE HEIGHT OF AN OBJECT OBSERVED BY A CAMERA

BACKGROUND

1. Field of the Invention

Embodiments of the present invention relate generally to digital cameras, and more specifically to determining information about objects observed by a digital camera.

2. Related Art

Digital imagery, for both still shots and motion pictures, is becoming more prevalent in modern society. Digital cameras and camcorders are integrated into all manner of personal electronics, such as computers, cell phones, and personal digital assistants (PDAs). Such cameras also appear as surveillance devices in stores, integrated into automatic teller machines (ATMs), and monitoring traffic intersections. Many digital cameras incorporate autofocus features, which allow the camera to automatically bring one focal plane into focus. Some digital cameras incorporate an array of autofocus sensors, which allows the camera to focus on any object perceived by a sensor, without needing to recenter the camera's field of vision on that object.

What digital cameras do not do, at present, is provide information about the subject of the image. While, for example, an ATM camera will include time and date information for any pictures taken, the only information provided about what is depicted in a picture recorded by the camera is the picture itself.

SUMMARY

Methods and systems for determining the height of an object observed by a camera are described. One such method involves determining the distance from the top of the object to the camera, determining the distance from the bottom of the object to the camera, measuring the angle of incidence, from the camera's perspective, between the top and bottom of the object, and computing the height of the object from the two distances and the angle of incidence.

A system for calculating the height of an object observed by a camera includes a camera and a graphics processing unit (GPU). The camera is configured to autofocus on the top and bottom of the object. The GPU uses the focus information from the camera to calculate the distance between the camera and the top of the object, as well as the distance between the camera and the bottom of the object. The angle of incidence is measured, and the GPU can then calculate the height of the object from the two distances and the angle of incidence.

A compression/decompression routine for video data is also described. This routine calls for compressed video images to be stored by a camera system. The routine also calls for focal distance information to be stored by the camera system, where the focal distance information describes the distance between the camera and selected points of the observed object. The routine also calls for information regarding the angle of incidence to be recorded. Storing such information as part of the compressed video file allows later viewers to extract the height of observed objects from the video.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention. While the invention will be described in conjunction with the alternative embodiment(s), it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of methods. Although steps and sequencing thereof are disclosed in a figure herein (e.g., FIG. 3) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
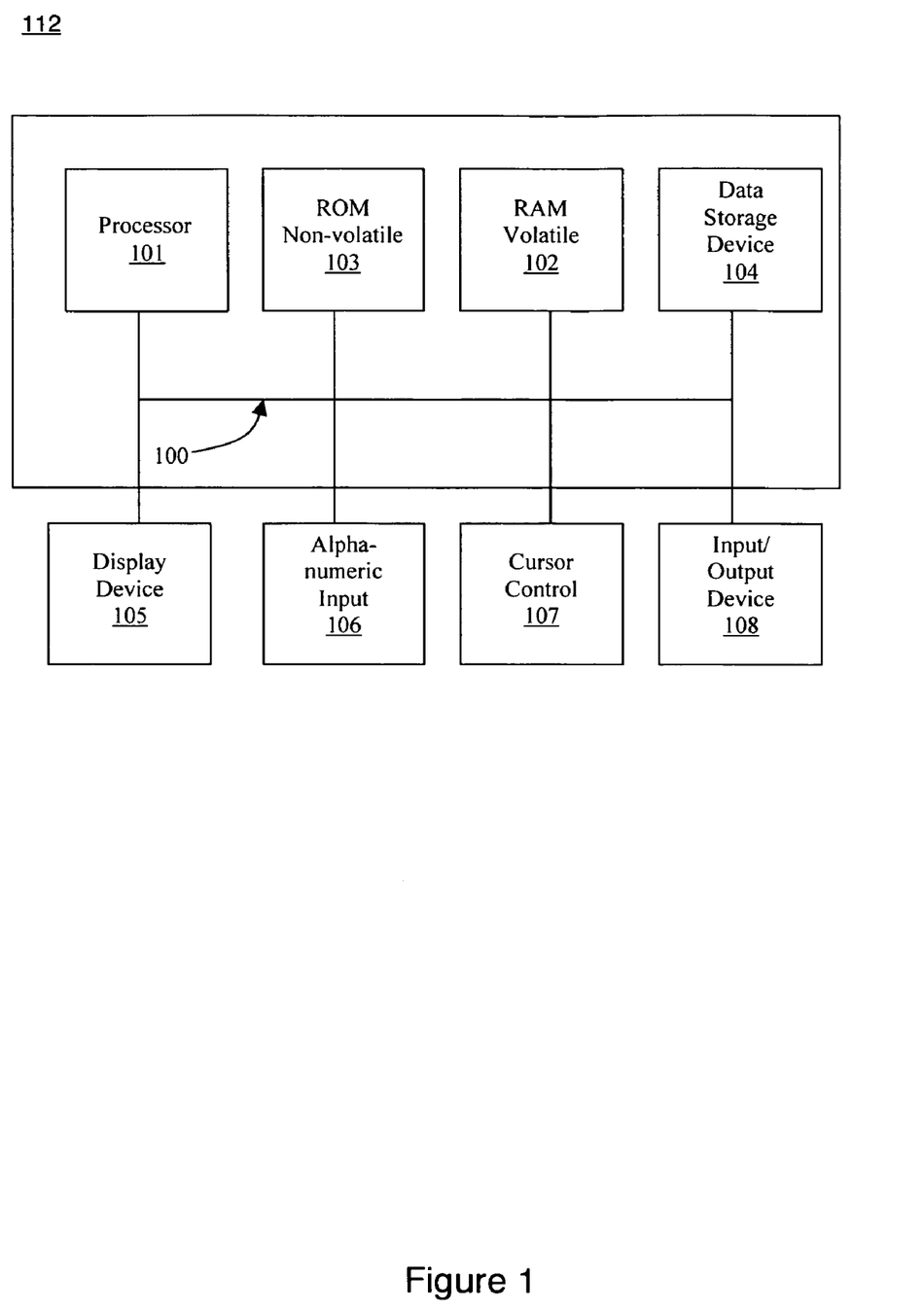
FIG. 1 is a block diagram of an exemplary computer system upon which embodiments of the present invention may be implemented.

Referring now to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1. Moreover, the present invention may be practiced on any system which can be configured to allow it, not just computer systems like computer system 112.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

It is understood that embodiments of the present invention can be practiced on many different types of computer system 112. Examples include, but are not limited to, desktop computers, workstations, servers, laptops, gaming consoles, and personal digital assistants (PDAs), as well as other electronic devices with computing and data storage capabilities, such as wireless telephones, media center computer, digital video recorders, digital cameras, and digital audio playback or recording devices.

Measuring the Height of an Object Perpendicular to the Camera

Figure 2:
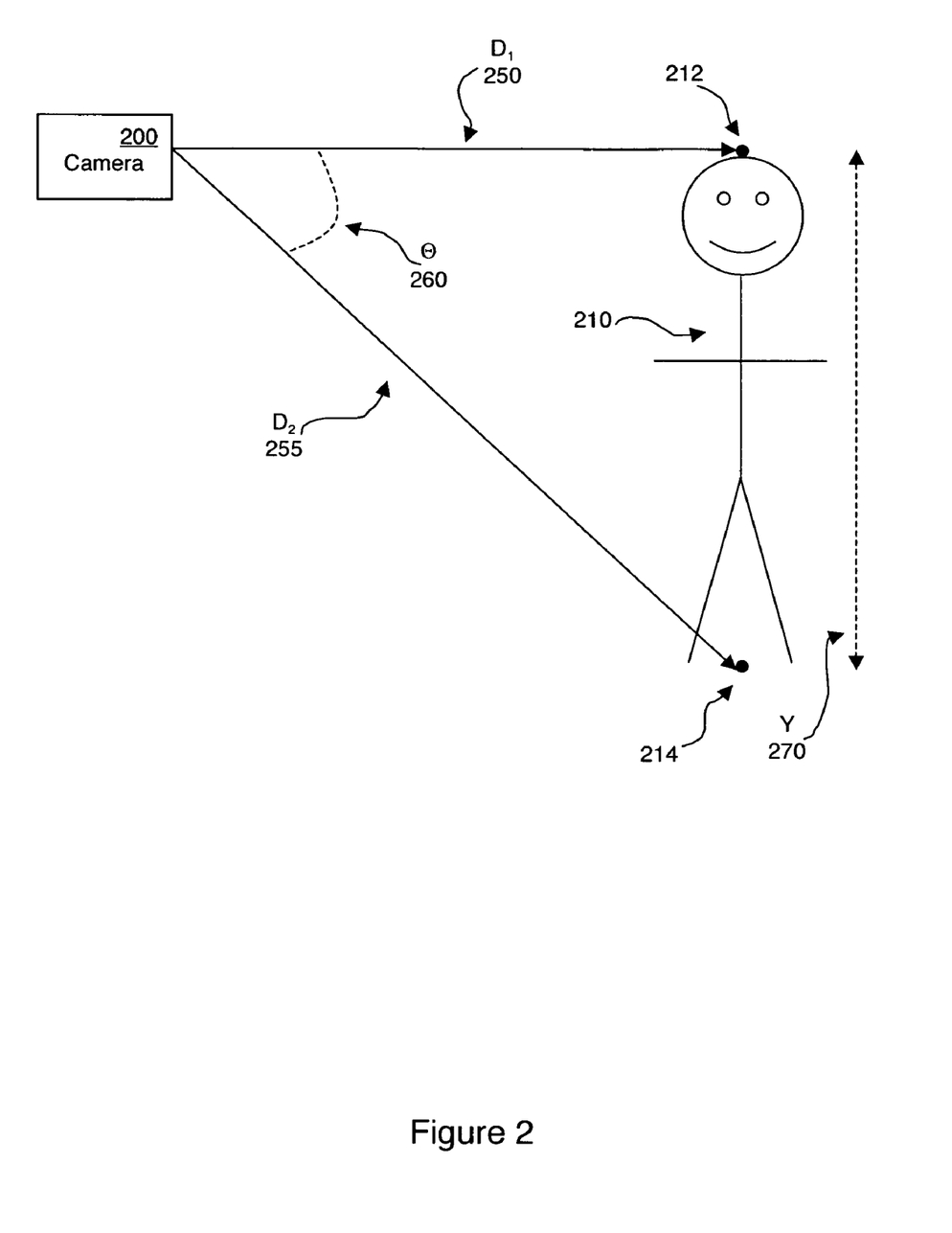
FIG. 2 is a representation of a situation to which embodiments of the present invention may be applied, in which an object lies on the same plane as a camera.

With reference now to FIG. 2, a scenario is depicted, to which embodiments of the present invention can be applied. In FIG. 2, camera 200 is observing an object, e.g., a person 210. The top of person 210's head, indicated as point 212, lies on the same horizontal plane as the lens of camera 200. Point 214 indicates the bottom of person 210's feet. Points 212 and 214, along with the lens of camera 200, define a right triangle. The three sides of this triangle are: arrow 250, which represents $D_1$, or the distance between the top of person 210's head and the lens of camera 200; arrow 255, which represents $D_2$, or the distance between the feet of person 210 and the lens of camera 200; and arrow 270, which represents Y, or the height of person 210. The angle 260 between arrows 250 and 255 is called the angle of incidence, and is labeled $\Theta$.

Camera 200 is shown as being coupled to a computer system, such as system 112. In some embodiments, system 112 is used to perform calculations related to this method. In other embodiments, system 112 is used for storing digital images captured by camera 200. In other embodiments, system 112 is omitted. In some embodiments, camera 200 incorporates a graphics processing unit (GPU), which is used to perform calculations related to these embodiments.

It is understood that while this method of measuring the height of an object is discussed with reference to specific embodiments, such discussion is intended as exemplary only. Embodiments of the invention discussed here are applicable to any object perceived by any visual sensor, and should not be construed as being limited to detecting the height only of a person, or only through use of a traditional camera with a lens. Similarly, while embodiments are discussed here to determine the height of an object, one skilled in the art will recognize that embodiments of this invention are equally applicable to determining other dimensions of an object, e.g., width or depth, or for calculating volume of an object, e.g., by determining height, width, and depth of an object using the described embodiments, then calculating volume from the known dimensions and well-known equations.

Figure 3:
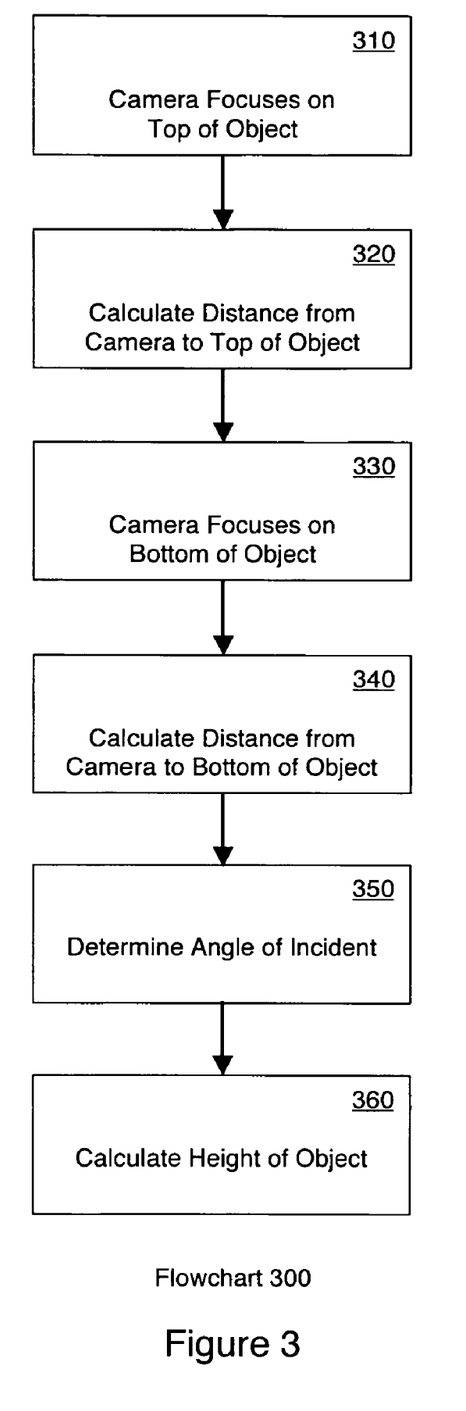
FIG. 3 is a flowchart of an automated method for determining the height of an object observed by a camera, in accordance with one embodiment of the present invention.

With reference now to FIG. 3, a flowchart 300 of an automated method of determining the height of an observed object is depicted, in accordance with one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

With reference now to step 310 and FIG. 2, camera 200 focuses on point 212, the top of the observed object. In many embodiments, step 310 is accomplished by utilizing known auto-focusing techniques. In one such embodiment, camera 200 is configured to utilize edge-detection, so as to determine where person 210 ends. In some embodiments, focusing is performed by a user.

With reference now to step 320 and FIG. 2, the distance $D_1$ is calculated. Different embodiments accomplish this step in different ways. In some embodiments, this distance is calculated based on the known focal length of the lens of camera 200, in conjunction with the focal distance utilized during step 310 to bring point 212 into focus. In embodiments where camera 200 is coupled to system 112, camera 200 passes this focus information to system 112, in order to allow system 112 to calculate $D_1$. In embodiments where camera 200 incorporates a GPU, the GPU performs this calculation. In another embodiment, camera 200 incorporates a sonar rangefinder. In such an embodiment, the time it takes for sound to emanate and return, can be used to determine distance, e.g., by dividing the speed of sound by the time lapsed between emission and return of the sound, dividing by 2 to get the distance between the camera and the object, and using known conversion factors to convert that distance into any desired format. In another embodiment, camera 200 incorporates an infrared rangefinder.

With reference now to step 330 and FIG. 2, camera 200 focuses on point 214, the bottom of the observed object. As with step 310, described above, many embodiments utilize known techniques for auto-focusing. In other embodiments, such focusing is performed by a user.

With reference now to step 340 and FIG. 2, the distance $D_2$ is calculated. This calculation, in some embodiments, is accomplished in the same manner as in step 320.

With reference now to step 350 and FIG. 2, the angle Θ is determined. In some embodiments, camera 200 incorporates a leveling mechanism. In such embodiments, as arrow 250 is horizontal, the leveling mechanism provides angle Θ. In other embodiments, angle Θ may be calculated.

TABLE 1

Eqn 1: sec (Θ) = $D_2/D_1$
Eqn 2: $sec^{-1}$ (sec(Θ)) = $sec^{-1}$ ($D_2/D_1$)
Eqn 3: Θ = $sec^{-1}$ ($D_2/D_1$)

Table 1, above, provides the steps for computing angle Θ, once $D_1$ and $D_2$ have been determined. This embodiment takes advantage of the geometrical relationships of the sides and the angles of a right triangle.

TABLE 2

Eqn 4: tan (Θ) = $Y/D_1$
Eqn 5: Y = tan (Θ)/$D_1$

With reference now to step 360 and FIG. 2, the height Y of the object is calculated. In some embodiments, this step is performed using the equations displayed in Table 2.

In some embodiments, steps 350 and 360 are combined into a single step. In some such embodiments, a single equation can be used to calculate the height of an object, as shown below in Table 3. Equation 6 is derived by substitution from the preceding five equations.

TABLE 3

Eqn 6: Y = tan ($sec^{-1}$ ($D_2/D_1$))/$D_1$

In some embodiments, other geometrical approaches can be utilized to determine the height of an object, without needing to determine angle Θ. One such embodiment, for example, utilizes the Pythagorean Theorem and the relationship between the three sides of a right triangle, in order to determine the height of person 210. Such an embodiment is easily applicable to the situation presented in FIG. 2, where point 212 lies on the same plane as the lens of camera 200, perpendicular to the ground. In such an embodiment, the equations depicted below in Table 4 can be used to solve for the height of the object. Such embodiments can therefore omit steps 350 and 360.

TABLE 4

Eqn 7: $D_1^2 + Y^2 = D_2^2$
Eqn 8: Y = $(D_2^2 - D_1^2)^{1/2}$

In some embodiments of the present invention, the method described in flowchart 300 is performed repeatedly for one object, and an average value of the height of the object is calculated. Several such embodiments relate to capturing the height of an object from video. Using a number of samples and averaging helps reduce errors caused by, e.g., failure to properly calculate the top or bottom points of the object. Such errors could be introduced by variations in the level of the surface the object is on, e.g., curbs or potholes, or by obstructions, e.g., a bush. Averaging, and other known statistical tools, can be utilized to provide a more accurate measure of the height of the object.

Measuring the Height of an Object Observed by a Camera

Figure 4:
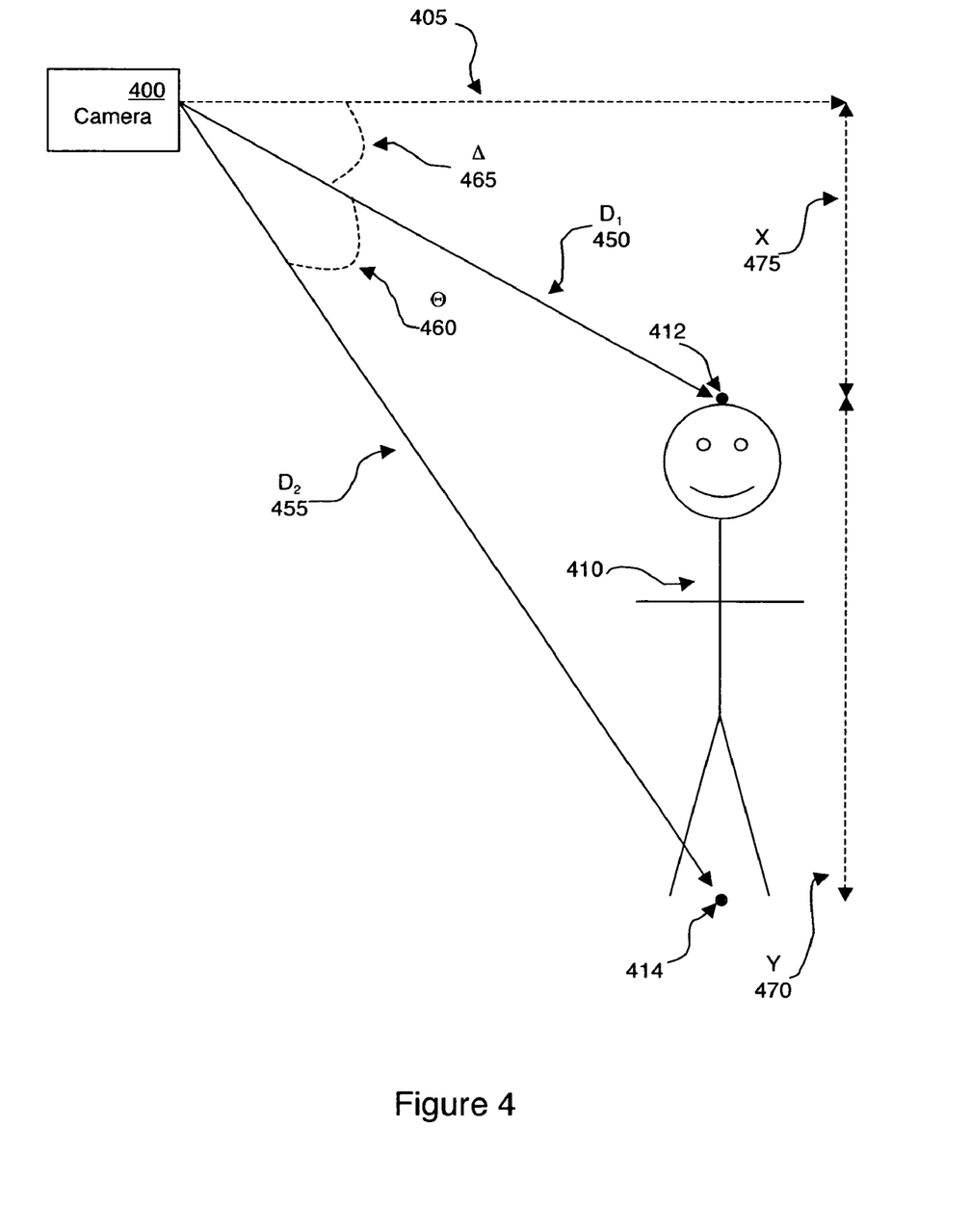
FIG. 4 is a representation of a situation to which embodiments of the present invention may be applied, in which an object lies on a different plane than a camera.

With reference now to FIG. 4, a scenario is depicted, to which embodiments of the present invention may be applied. In FIG. 4, camera 400 is observing person 410. The top of person 410's head, indicated as point 412, lies below the horizontal plane 405 of the lens of camera 400. Point 414 indicates the bottom of person 410's feet. Points 412 and 414, along with the lens of camera 400, define a triangle. The three sides of this triangle are: arrow 450, which represents $D_1$, or the distance between the top of person 410's head and the lens of camera 400; arrow 455, which represents $D_2$, or the distance between the feet of person 410 and the lens of camera 400; and arrow 470, which represents Y, or the height of person 410. The angle 460 between arrows 450 and 455 is called the angle of incidence, and is labeled Θ. Point 412, camera 400, and horizontal plane 405 define a right triangle. One side of the triangle is arrow 475, representing X, where X is defined as the distance between point 412 and horizontal plane 405, which is also described as the vertical off-set of person 410. A second side of the triangle is formed by horizontal plane 405. The hypotenuse of the triangle is $D_1$. The angle between horizontal plane 405 and $D_1$, angle 465, or the offset angle, is labeled Δ.

Figure 5:
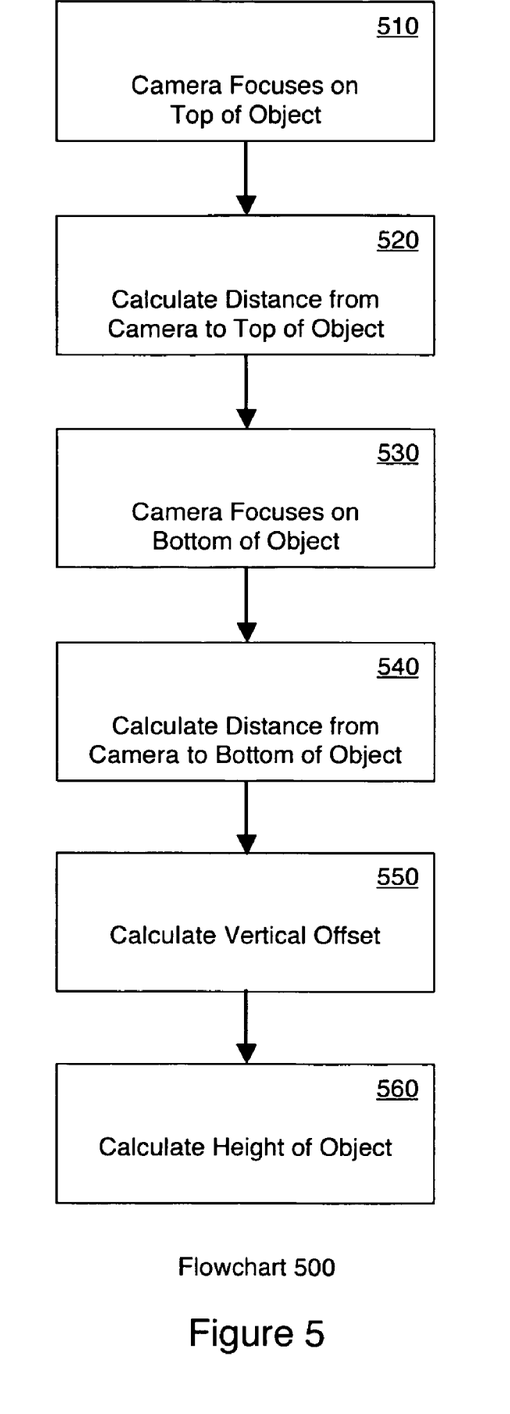
FIG. 5 is a flowchart of an automated method for determining the height of an object observed by a camera, in accordance with one embodiment of the present invention.

With reference now to FIG. 5, a flowchart 500 depicting an automated method of determining the height of an object observed by a camera is depicted, in accordance with one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 510 and FIG. 4, camera 400 focuses on the top of the object, point 412. As described above, with reference to step 310, embodiments of the present invention utilize known techniques to identify the top of person 410's head, and to focus on that point.

With reference now to step 520 and FIG. 4, the distance $D_1$ between camera 400 and point 412 is determined. This determination is implemented differently in different embodiments, as described above with reference to step 320.

With reference now to step 530 and FIG. 4, camera 400 focuses on the bottom of the object, point 414. As discussed previously, such focusing can be accomplished using known approaches.

With reference now to step 540 and FIG. 4, the distance $D_2$ between camera 400 and point 414 is calculated, using approaches described above.

With reference now to step 550 and FIG. 4, the vertical offset of person 410, X, is calculated. In some embodiments, angle 465, Δ, is determined first. In an embodiment where camera 400 is equipped to pivot vertically, camera 400 is configured to detect changes in the angle between camera 400 and horizontal plane 405. In one embodiment, camera 400 includes a leveling device; in such an embodiment, camera 400 can determine angle Δ by referencing the leveling device to determine angle Δ. Once angle Δ is known, the equations presented in Table 5 can be performed to determine X, the vertical offset.

TABLE 5

Eqn 9: $\sin(\Delta) = X/D_1$
Eqn 10: $X = D_1 * \sin(\Delta)$

With reference now to step 560 and FIG. 4, the height, Y, of person 410 is calculated. In some embodiments, angle 460, Θ, must be determined first. In some embodiments utilizing the approach presented above, with reference to step 550, angle Θ is known to camera 400. By applying the equations presented in Table 6, Y can be determined.

TABLE 6

Eqn 11: $\sin(\Delta + \Theta) = (X + Y)/D_2$
Eqn 12: $D_2 * \sin(\Delta + \Theta) = X + Y$
Eqn 13: $Y = D_2 * \sin(\Delta + \Theta) - X$ In some embodiments, steps 550 and 560 are combined into a single step, and a single calculation is utilized to determine the height of an object, as shown below in Table 7. Equation 14 is derived from Equations 9-13.

TABLE 7

Eqn 14: $Y = (D2 * \sin(\Delta + \Theta)) - (D1 * \sin \Delta)$

In some embodiments of the present invention, the method described in flowchart 500 is performed repeatedly for one object, and an average value of the height of the object is calculated. Several such embodiments relate to capturing the height of an object from video. Using a number of samples and averaging helps reduce errors caused by, e.g., failure to properly calculate the top or bottom points of the object. Such errors could be introduced by variations in the level of the surface the object is on, e.g., curbs or potholes, or by obstructions, e.g., a bush. Averaging, and other known statistical tools, can be utilized to provide a more accurate measure of the height of the object.

Cameras with Multiple Autofocus Points

Figure 6:
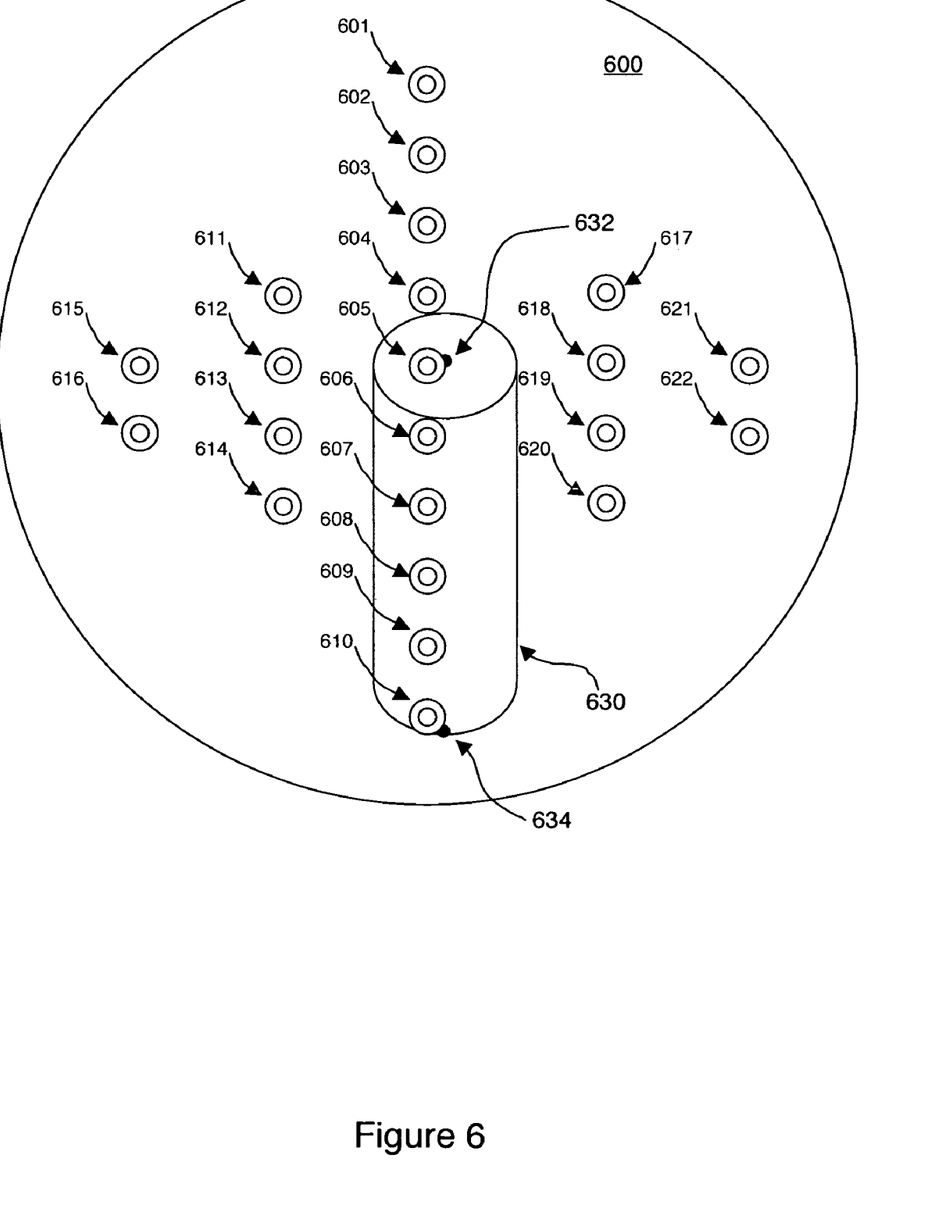
FIG. 6 is a representation of a situation to which embodiments of the present invention may be applied, in which a camera lens with multiple autofocus sensors observes an object.

With reference now to FIG. 6, a representation of a view from a camera 600 is presented. In this embodiment, camera 600 has an array of autofocus sensors, 601 through 622. Camera 600 is observing object 630. In embodiments where the observing camera has multiple autofocus sensors, the methods detailed above with reference to FIGS. 3 and 5 are applicable.

Figure 7:
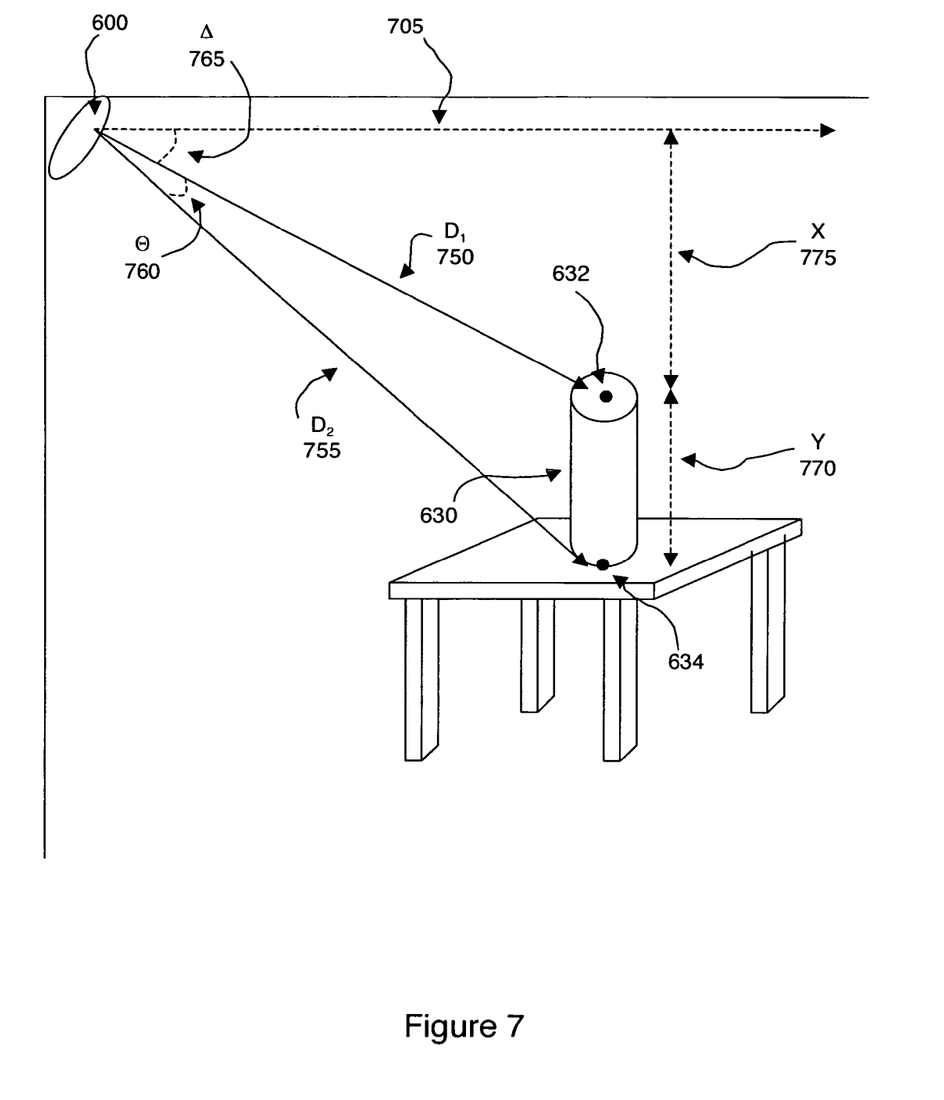
FIG. 7 is a representation of a situation to which embodiments of the present invention may be applied, in which a camera with multiple autofocus sensors observes an object lying on a different plane.

With reference now to FIG. 7, a scenario involving camera 600 and object 630 is depicted, upon which embodiments of the present invention may be practiced. In some embodiments, camera 600 is in a fixed position and does not pivot. In such embodiments, camera 600 can be implemented as a wide-angle lens, so as to provide visual coverage over a large region without needing to pivot. In one such embodiment, camera 600 has a "fisheye" lens. FIG. 7 shows horizontal plane 705, running parallel to the ceiling and perpendicular to the walls. Object 630 lies within the field of view of camera 600, and has a top point, 632, and a bottom point, 634. The vertical offset of object 630, X, is marked by arrow 775. The offset angle, Δ, is indicated as angle 765. The angle of incidence, Θ, is indicated as angle 760. The distance from camera 600 to point 632, $D_1$, is indicated by arrow 750. The distance from camera 600 to point 634, $D_2$, is indicated by arrow 755. Object 630 is Y tall, as indicated by arrow 770.

With reference now to step 510 and FIGS. 6 and 7, camera 600 focuses on the top of object 630, point 632. In cameras with multiple autofocus sensors, the sensor nearest the top, here sensor 605, can be selected individually, and the lens focused based on that sensor, using known techniques.

With reference now to step 520 and FIGS. 6 and 7, the distance between camera 600 and point 632, $D_1$, can be calculated, in the same manner as described above, with reference to FIG. 3.

With reference now to step 530 and FIGS. 6 and 7, camera 600 focuses on the bottom of object 630, point 634. In this embodiment, camera 600 does not need to pivot to focus on the bottom of object 630. Autofocus sensor 610 can be selected to focus on point 634.

With reference now to step 540 and FIGS. 6 and 7, the distance between camera 600 and point 634, $D_2$, can be determined.

With reference now to step 550 and FIGS. 6 and 7, the vertical offset of object 630, X, is calculated, which requires that the offset angle, Δ, between horizontal plane 705 and $D_1$ be determined. In embodiments where camera 600 is in a fixed position, camera 600, or a computer system or GPU connected to camera 600, can be configured to recognize which autofocus sensor lies on this horizontal plane, and the angles between that baseline sensor and the other autofocus sensors can then be fixed. In this embodiment, for example, where camera 600 is a security camera mounted near the ceiling of a room, autofocus sensor 601 is this baseline sensor, and camera 600 is mounted at an angle, as shown in FIG. 7. In this embodiment, the angle between autofocus sensors 601 and 605 is preconfigured, and so Δ is known. From Δ and $D_1$, the vertical offset X is calculated from Equations 9 and 10.

With reference now to step 560 and FIGS. 6 and 7, the height Y of object 630 is calculated. First, Θ can be determined, by the same process described above with reference to step 550 and angle Δ. Given Θ, Y can be calculated from Equations 11, 12, and 13. Alternatively, some embodiments utilize equation 14, and solve for the height of object 630 in a single calculation.

Cameras with a Continuum of Autofocus Points

Older autofocus cameras frequently have a single autofocus point, corresponding to the center point of the viewfinder. More recently, cameras have begun to include multiple autofocus points, allowing the camera to focus on objects not currently centered in the viewfinder; one such camera is exemplified in FIGS. 6 and 7.

Figure 8:
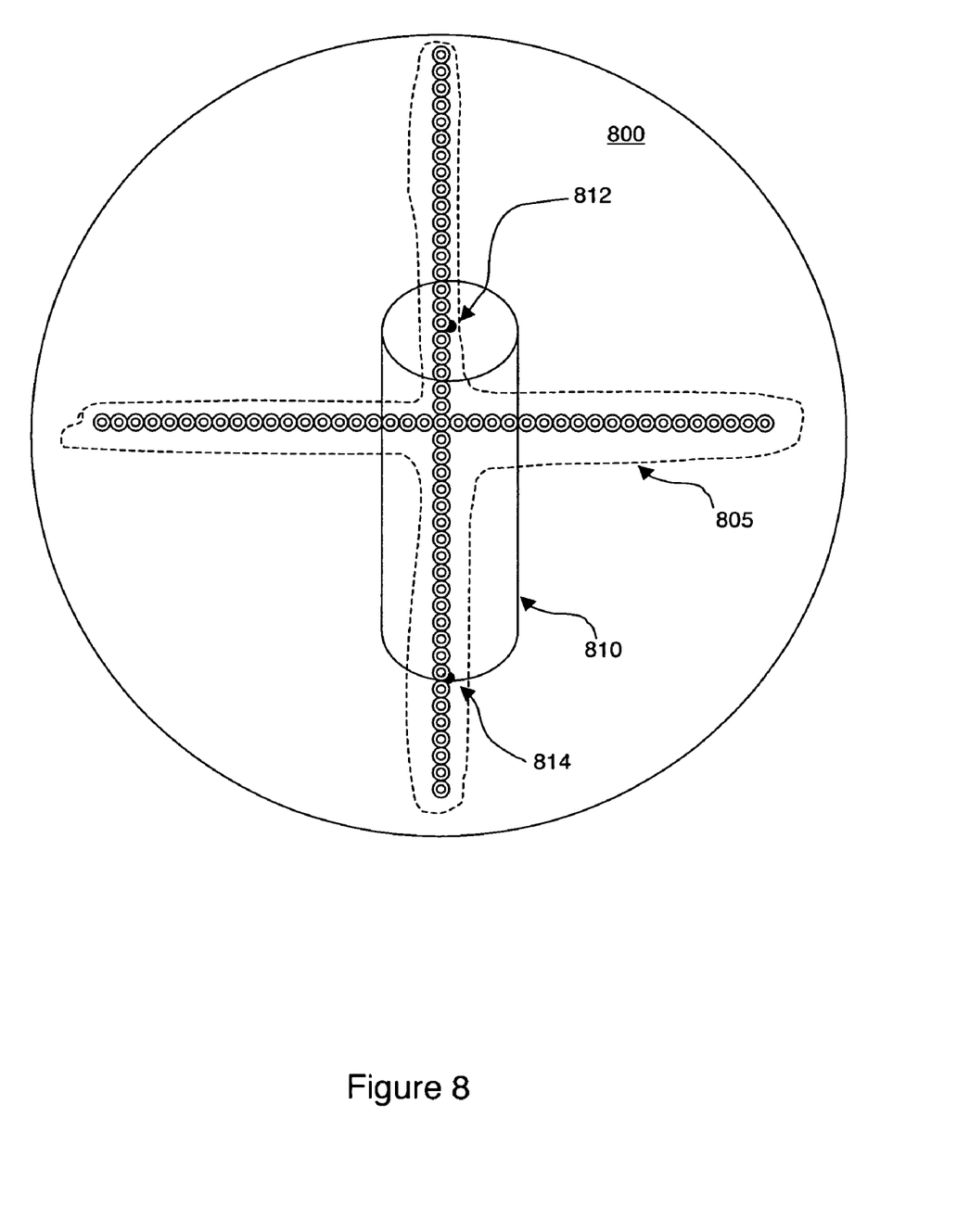
FIG. 8 is a representation of a situation to which embodiments of the present invention may be applied, in which a camera lens with a continuum of autofocus sensors observes an object.

With reference now to FIG. 8, a camera 800 with a continuum of autofocus points is utilized, in accordance with embodiments of the present invention. FIG. 8 shows an array of autofocus sensors 805, providing continuous autofocus coverage across the horizontal and vertical fields of view of camera 800. While array of autofocus sensors 805 is depicted as having a cross configuration, it is understood that any configuration of sensors that provides continuous autofocus coverage may be utilized with embodiments of the present invention. In one preferred embodiment, for example, the array of autofocus points provides coverage across the entire field of view of the lens.

Camera 800 is shown as viewing objects 810 and 860. As with the preceding embodiments, discussed with reference to FIGS. 6 and 7, camera 800 can be configured to implement the method described in Flowchart 500. Camera 800, however, can autofocus on points 812 and 814, wherever they lie along the vertical access; camera 600 had gaps in autofocus coverage. As such, while camera 600 would need to be moved to focus precisely on points 632 and 634, camera 800 need not move to focus on points 812 and 814. Alternatively, camera 600 would need to estimate the locations of points 632 and 634, with reference to the nearest autofocus points. Such an arrangement provides a better solution for moving objects, e.g., a person, and allows for faster calculations, as it is not necessary to first estimate where points 812 and 814 lie.

Determining the Height of Objects Recorded on Video

In some embodiments, a camera can be configured to output video information in such a manner as to allow the height of objects recorded on video to be determined at a later time, using the methods previously described. Such embodiments require that certain information, not commonly recorded, be preserved as part of the video data. In these embodiments, the standard compression/decompression routines utilized for storing video, e.g., MPEG, are expanded to include an additional data track.

In some embodiments, such as those described with reference to FIG. 2, information with respect to $D_1$ and $D_2$ is preserved. In several such embodiments, the focal properties of camera 200 are assumed to be available during later playback of recorded video, and therefore only focus information is included in the video signal. In several other embodiments, the signal output by camera 200 includes $D_1$ and $D_2$, as determined by a GPU and described above with reference to step 320.

In other embodiments, such as those described with reference to FIG. 4, information regarding $D_1$, $D_2$, the offset angle $\Delta$, and the angle of incidence $\Theta$ is preserved as part of the video data. In several such embodiments, the focal properties of camera 400 are assumed to be available during later playback of recorded video, and therefore only focus information and pivot angle information are included in the video signal. In several other embodiments, the signal output by camera 400 also includes $D_1$ and $D_2$, as determined by a GPU and described above with reference to step 520.

In further embodiments, such as those described with reference to FIGS. 6 and 7, information regarding $D_1$, $D_2$, the offset angle $\Delta$, and the angle of incidence $\Theta$ is preserved as part of the video data. In several such embodiments, the focal properties of camera 600 are assumed to be available during later playback of recorded video, and therefore only focus information and autofocus sensor information are included in the video signal. In several other embodiments, the signal output by camera 600 includes $D_1$ and $D_2$, as determined by a GPU and described above with reference to step 520. In other embodiments, the signal output by camera 600 also includes angles $\Delta$ and $\Theta$.

Embodiments of the present invention described above thus relate methods and systems for automatically determining the height of an object observed by a camera. While the present invention has been described in particular embodiments, it should be appreciated that the present invention should not be construed as limited by such embodiments, but rather construed according to the below claims.

What is claimed is:

1. A method of calculating the height of an object observed by a camera, said method comprising:
    determining a first distance from the top of said object to said camera, wherein said determining said first distance is performed with reference to a first known focal length;
    determining a second distance from the bottom of said object to said camera, wherein said determining said second distance is performed with reference to a second known focal length;
    measuring an angle of incidence, from said camera's perspective, between the top and the bottom of said object; and
    computing the height of said object from said first distance, said second distance, and said angle of incidence.

2. The method of claim 1, further comprising:
    measuring an offset angle, wherein said offset angle is the angle between a horizontal plane and the top of said object; and
    determining a vertical offset distance from said first distance and said offset angle.

3. The method of claim 1, wherein said measuring an angle of incidence is accomplished by referencing a leveling device incorporated into said camera.

4. The method of claim 1, wherein said measuring an angle of incidence is accomplished by referencing known distances between a plurality of autofocus sensors incorporated into said camera.

5. The method of claim 1, wherein said camera comprises a video camera.

6. The method of claim 5, further comprising:
    repeatedly calculating the height of said object observed by said video camera; and
    computing an average height of said object.

7. A system for calculating the height of an object observed by a camera, said system comprising:
    a camera; and
    a processor, coupled to said camera,
    wherein said camera is configured to autofocus on the top and bottom of said object; wherein said processor is configured to compute a first distance from the top of said object to said camera, a second distance from the bottom of said object to said camera, and an angle of incidence, from said camera's perspective, between the top and the bottom of said object; and wherein said processor is further configured to calculate the height of said object from said first distance, said second distance, and said angle of incidence.

8. The system of claim 7, wherein said camera comprises an array of auto-focus elements, and wherein said processor is configured to determine said angle of incidence by computing an angle between two of said array of auto-focus elements.

9. The system of claim 8, wherein said array of auto-focus elements provides continuous coverage across a field of view of said camera.

10. The system of claim 9, wherein said array of auto-focus elements allows said camera to autofocus on the top and bottom of said object without changing the position of said camera.

11. The system of claim 7, wherein said camera comprises a video camera.

12. The system of claim 7, wherein said camera comprises a still picture camera.

13. The system of claim 7, wherein said camera comprises a level meter and a pivot mount, and wherein said processor is configured to determine said angle of incidence by referencing said level meter.

14. The system of claim 7, wherein said processor is further configured to calculate a vertical offset distance of said object, said vertical offset being the distance between the top of said object and a horizontal plane defined by said camera.

15. A computer implemented compression/decompression process for video data, comprising:

storing compressed video images of an object, said object having been observed by a camera system;

storing focal distance information, said focal distance information comprising distance information between said camera system and a plurality of points on said object; and storing angle of incidence information, said angle of incidence information describing the angle between two of said plurality of points on said object, from said camera's perspective.

16. The compression/decompression process of claim 15, further comprising:

storing compressed audio data.

17. The compression/decompression process of claim 15, further comprising:

calculating a distance between two of said plurality of points on said object by using said stored focal distance information and said store angle of incidence.

18. The compression/decompression process of claim 17, wherein said distance between two of said plurality of points on said object corresponds to the height of said object.

19. The compression/decompression process of claim 17, wherein said distance between two of said plurality of points on said object corresponds to the width of said object.

20. The compression/decompression process of claim 15, further comprising:

storing offset angle information, said offset angle information describing the angle between a horizontal plane and one of said plurality of points on said object, from said camera's perspective.

* * * * *